United States Patent [19]
Bottomley

[11] Patent Number: 6,004,028
[45] Date of Patent: Dec. 21, 1999

[54] DEVICE AND METHOD FOR RECEIVING AND RECONSTRUCTING SIGNALS WITH IMPROVED PERCEIVED SIGNAL QUALITY

[75] Inventor: Gregory Edward Bottomley, Cary, N.C.

[73] Assignee: Ericsson GE Mobile Communications Inc., Research Triangle Park, N.C.

[21] Appl. No.: 08/292,304

[22] Filed: Aug. 18, 1994

[51] Int. Cl.$^6$ ........................................................ H04L 1/20
[52] U.S. Cl. ........................................................ 371/37.7
[58] Field of Search .................... 371/31, 43, 44, 371/45, 37.1, 37.7

[56] References Cited

U.S. PATENT DOCUMENTS

| | | | |
|---|---|---|---|
| 5,113,400 | 5/1992 | Gould et al. | 371/43 |
| 5,208,816 | 5/1993 | Seshardi et al. | 371/43 |
| 5,396,516 | 3/1995 | Padovani et al. | 375/225 |
| 5,473,727 | 12/1995 | Nishiguchi et al. | 395/2.31 |

OTHER PUBLICATIONS

MCLaughlin, M. et al., "Speech and Channel Coding for Digital Land–Mobile Radio", *IEEE Jour. on Selected Areas in Comm.*, vol. 6, No. 2, Feb. 1985, pp. 332–345.

*Primary Examiner*—Stephen M. Baker
*Attorney, Agent, or Firm*—Charles L. Moore

[57] ABSTRACT

A device and method for receiving and reconstructing signals with improved perceived signal quality in a digital communications system is disclosed. The device and method utilize side information defining the quality or accuracy of recovered digital symbols representing an information signal and also utilizing past frame erasure information to determine whether to erase or use a frame to reconstruct the original information signal even though an error detection mechanism indicates that no error exists in the recovered digital symbols of the frame.

22 Claims, 4 Drawing Sheets

DEVICE AND METHOD FOR RECEIVING
AND RECONSTRUCTING SIGNALS WITH
IMPROVED PERCEIVED SIGNAL QUALITY

BACKGROUND OF THE INVENTION

The present invention relates to the reconstruction of an information signal from a recovered digital signal in a digital communications system, and more particularly, to a novel device and method for improving the perceived signal quality using an adaptive frame erasure mechanism in which a frame may be erased even though an error detection mechanism indicates that no errors are present in the recovered digital signal.

Digital communication techniques have provided economic, robust ways of transferring or storing information signals. These techniques involve converting an information signal to a digital form, as a set of digital symbols, which are then transferred or stored in some representation or form that facilitates transmission over some medium or storage. Typically, the digital symbols are binary-valued, which are referred to as bits. The original information signal may be reconstructed by recovering the digital symbols or bits from the representation; the recovered digital symbols are then used by a processing unit to reconstruct the information signal.

This approach or process has been applied to a variety of audio and/or visual information signals. In speech communications systems, speech signals are converted to digital form using speech encoders, such as VSELP, LPC-RPE or the like. Recordings on compact discs, for example, store audio signals in a digital format. In video teleconferencing and video compression, video signals are compressed into digital forms using compression algorithms, such as those developed by JPEG and MPEG, for efficient transmission. Additionally, text may be converted into digital form for message service systems, such as e-mail and CD-ROM applications. All of these applications may be viewed as digital communications.

Figure 1:
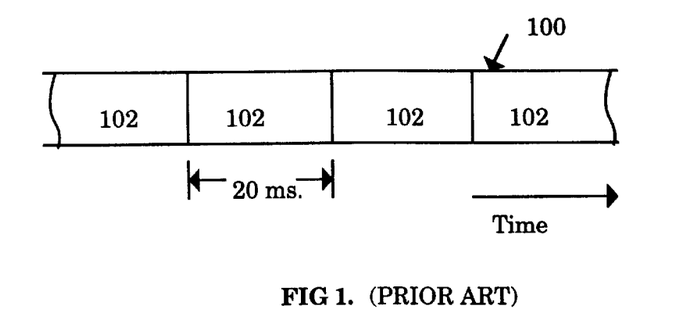
FIG. 1 is a block diagram representation of an information signal divided into a plurality of frames.

Referring to FIG. 1, in a typical digital communications system, the information signal, represented by Block 100, is divided into a series of short segments, referred to as frames 102. The portions of the information signal within each of these frames 102 are then converted into respective sets of digital symbols. These symbols are conveyed or transmitted for each frame using a certain representation, which depends upon the medium being used to transmit or store the digital symbols. For example, a frame 102 may represent twenty milliseconds of speech or a single image in a video signal. This twenty millisecond frame may be converted to a digital representation or form containing about two hundred sixty bits or digital symbols. These bits may be represented as or converted to radio waves by a communications transmitter, such as a digital cellular telephone or the like, and transmitted from an antenna of the transmitter.

When the digital symbols are communicated over some medium or written into or read from a storage device, errors may occur in recovering the digital symbol values. These errors may cause a degradation in the signal quality perceived by a listener or user of the communications system. To address this problem, error detection encoding may be applied to the digital symbols before the representation process. Typically, error detection encoding is applied to each frame 102 separately. When the signal is reconstructed, a decoding operation or error checking procedure is used to determine if there are any errors in the digital information symbols of a frame 102. If an error is detected, then the digital symbols in that frame 102 are not used to reconstruct the original information signal 100. This is commonly referred to as "frame erasure." When a frame erasure occurs, frame replacement procedures may be used to determine the disposition of the information represented by the digital symbols within the erased frame with regard to the reconstruction of the original information signal 100.

Accordingly, error detection decoding is used to determine if a frame 102 is erased. If the code in an error detection decoder detects that an error has occurred in the recovery of the digital representation of a signal, the frame 102 is erased; however, if the code within the error detection decoder does not detect that any errors occurred in the recovery of the signal, the frame 102 will be used to reconstruct the original information signal 100. When a frame 102 is erased, there may be a degradation in the reconstructed signal.

In conventional communications systems, the symbol or bit recovery process is designed to maximize the probability that the recovered digital symbols are the correct ones or substantially the same as the digital symbols before representation and transmission or storage. Accordingly, the number of symbol errors is minimized which minimizes the number of frame erasures. Techniques which improve the quality of the recovered error detection encoded symbols are often added to the symbol recovery process as a means of improving the quality of the reconstructed signal.

There are two problems associated with the signal recovery and reconstruction process. First, it is possible for the error detection decoding to indicate that no errors are present in the recovered digital symbols, when in fact, there are errors present. This is because error detection decoders are fundamentally limited in their ability to detect all possible error patterns. Additionally, in many applications, error detection encoding is only applied to a subset of the digital symbols within each frame. The error detection encoded symbols are usually those symbols that have the most impact on the reconstruction process because they are the most perceptible symbols or bits and are often referred to as such. While the error detecting code within the error detection decoder may correctly indicate that the subset of symbols are without error, there may be errors in the symbols not encoded by the error detection encoder. When symbols or bits that are in error are used to reconstruct the information signal, the quality of the reconstructed signal is perceived to be degraded by the user.

Secondly, the design approach of minimizing frame erasure rate assumes that erasing a frame causes a degradation in quality as perceived by a listener and/or viewer. If the frame erasure rate, however, is fairly low, the frame erasures are not perceived by the user, but significant bit errors on unerased frames may be perceived by the user.

It is, accordingly, a primary object of the present invention to provide a novel device and method for improving perceived signal quality in a communications system which is not subject to the foregoing disadvantages.

It is another object of the present invention to provide a novel device and method for improving perceived signal quality wherein a decision whether to erase a recovered frame of digital symbols in the reconstruction of an information signal is a function of the side information from the recovery process and previous frame erasure information, even though the error detection decoding indicates no errors are present in the recovered symbols or bits.

It is a further object of the present invention to provide a novel device and method for improving perceived signal quality wherein the decision to erase the frame is adaptively determined in response to previous frame erasure information.

These and other objects of the invention together with the features and advantages thereof, will become apparent from the following detailed specification when read with the accompanying drawings in which like reference numerals refer to like elements.

SUMMARY OF THE INVENTION

In accordance with the present invention, a device for receiving and reconstructing signals with improved perceived signal quality in a digital communications system includes a recovery unit for receiving a digital representation of an information signal, divided into a plurality of frames, from a transmitter of the communications system. The recovery unit converts each frame of the digital representation into a corresponding frame of recovered digital symbols and side information representing the accuracy, reliability or quality of the recovered symbols. An error detection decoder is applied to determine if errors are present in at least a portion of the recovered symbols, giving an error indicator as an output. A reconstruction unit is coupled to the decoder to reconstruct the original information signal from the recovered symbols using the side information from the recovery unit and/or decoder unit and the error indicator from the decoder. The reconstruction unit erases or does not use a frame of the recovered digital symbols to reconstruct the information signal in response to the side information indicating a possible error in the recovered digital symbols or bits of the frame and past frame erasure information, even though the error detection decoder detected no errors in the recovered digital symbols of the frame.

In accordance with the present invention, a method for improving perceived signal quality in a receiver of a digital communications system includes the steps of: (a) recovering a digital representation of an information signal divided into frames and transmitted over a channel of the communications system to provide a set of recovered digital symbols, divided into corresponding frames, and side information associated with each frame and defining the quality, reliability or accuracy of the recovered digital symbols; (b) applying error detection decoding sequentially to each frame of recovered digital symbols to provide an error indication; (c) reconstructing the information signal from the recovered digital symbols; and (d) determining whether to use a frame of the group of frames to reconstruct the information signal in response to the side information of the frame and past frame erasure decisions when the error indicator indicates that no errors were detected in the recovered digital symbols of the frame.

DETAILED DESCRIPTION OF THE PREFERRED EMBODIMENTS

Figure 2:
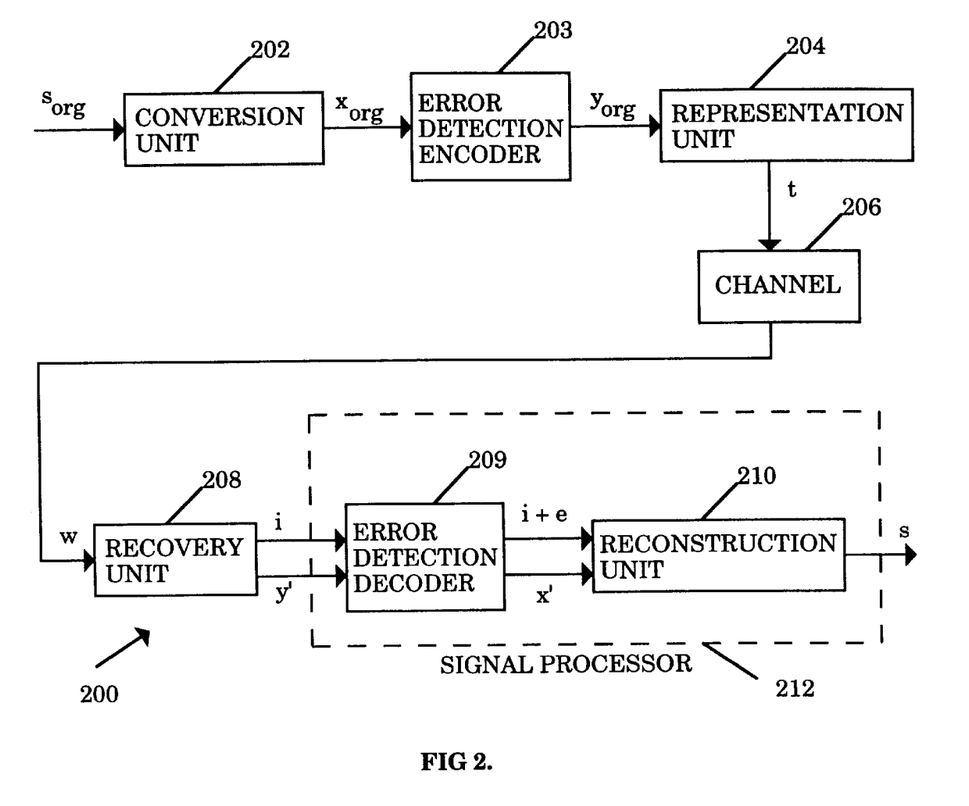
FIG. 2 is a block schematic of a system for transferring information with improved perceived signal quality in accordance with the present invention.

Referring initially to FIG. 2, a system 200 for information transfer using digital representation of an information signal is shown. The original information signal, $S_{org}$ is converted by frames 102 (FIG. 1) to a set of digital symbols, $x_{org}$, using a conversion unit 202, such as, for example, a microphone, A/D convertor, speech encoder or the like. Some or all of digital symbols $x_{org}$ are error detection encoded in an error detection encoder 203 and then converted by frames to a particular form or representation t for transmission or storage depending upon the transmission or storage medium using a representation unit 204, such as a digital radio transmitter or the like. The medium, indicated by communication channel 206 in FIG. 2, may alter or add to the representation. For example, the representation may be distorted or noise may be added by the channel 206. The resulting representation of the digital symbols is indicated by w in FIG. 2. A recovery unit 208 determines the digital symbols or bits present, denoted by y'. The recovery unit 208 may be a radio receiver or the like. The recovery process also produces side information, i, for each frame which gives reliability or quality information concerning the recovered symbols y' within a particular frame. Thus, the side information i may consist of one or more quality measures, such as soft information, signal strength, or a bit-error-rate estimate. Some or all of the recovered symbols y' and side information i are passed individually by frames to a signal processor 212, which applies error detection decoding in decoder 209 and signal reconstruction in reconstruction unit 210 to provide a reconstructed signal s. An example of a signal processor 212 will be described in more detail herein below.

Figure 3:
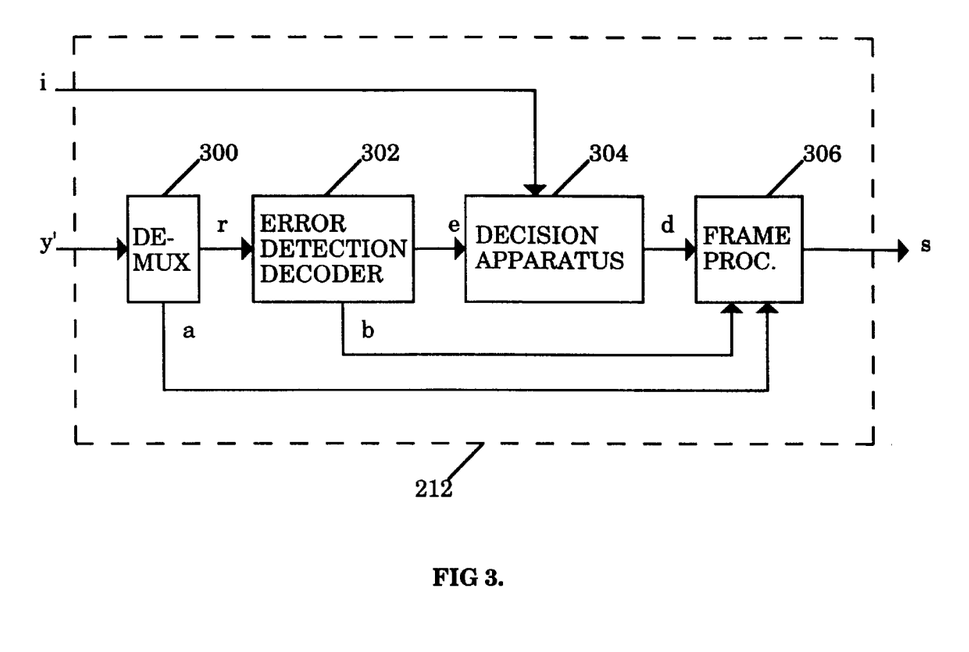
FIG. 3 is a block schematic of a signal processor unit for improving perceived signal quality in accordance with the present invention.

Referring also to FIG. 3, in accordance with the present invention, the signal processor 212 includes a DE-MUX unit 300 for de-multiplexing the recovered digital symbols y' of each frame into two sets of digital symbols denoted as r and a in FIG. 3. The first set of digital symbols, r, corresponds to code symbols from an error detection code. An error detection code may be applied to the information symbols by the error detection encoder 302. The second set of digital symbols, a, have no error detection coding. If all of the symbols y' recovered have error detection coding, then DE-MUX 300 can be omitted and all digital symbols y' may be passed directly to an error detection decoder 302, which may be implemented in a digital signal processor.

The error detection decoder 302 decodes the digital symbols r of each frame to produce decoded symbols b. The decoder 302 also provides information regarding error detection for each frame, denoted by e in FIG. 3, as to whether errors were detected in the recovered digital symbols r of a particular frame. In general, the error detection decoder 302 may also provide some error correction, in which case the error information e might reflect whether error correction could or would be used. The error information e for each frame is passed individually to a decision apparatus 304, which also receives the side information i individually for each frame. An example of decision apparatus 304 will be described in more detail herein below with reference to FIGS. 4 and 5. Using both e and i for a present or particular frame, the decision apparatus 304 makes a decision, d, whether or not to use a particular frame of digital symbols in reconstructing the information signal s. This decision d is typically binary or a bit which indicates either (1) to use the recovered digital symbols a and b of a particular frame in the signal reconstruction, or (2) not to use the recovered symbols a and b. The decision bit d is passed from decision apparatus 304 to a frame processor 306 which reconstructs the information signal s, either using or not using the recovered digital symbols, sets a and b of a particular frame, depending upon the decision bit d for that frame. The frame processor 306 may be a TMS320C50 DSP by Texas Instruments or the like. If the decision d indicates that the current set of digital symbols a and b of a frame may be used, then the frame processor 306 reconstructs the current frame using the current digital symbols and known standard techniques, such as speech encoding, D/A conversion and acoustic conversion via a speaker. However, if the decision d is to erase the frame, then the frame processor 306 uses some form of frame replacement or error handling.

Methods for frame replacement are known to those skilled in the art, however, a few examples are provided for purposes of illustration. One method is to replace the erased frame with a previous frame which may be attenuated. A second method is to interpolate using adjacent frames. Another method is to request a retransmission or second recovery of the frame. Further methods allow signal parameters to change in a limited way or exploit additional structure derived from the signal to replace the erased frame with an improved version.

In accordance with the present invention, side information i is also used by decision apparatus 304 in determining the decision d. The decision apparatus 304 also keeps track of past decisions, which can influence the current decision d. As a result, the decision apparatus 304 may decide to erase a frame even when the error information or indicator e indicates that no errors are present in the frame. This provides improved signal quality perceived by the user, viewer or listener because known error detection mechanisms are not perfect and errors can still be present in the frame but not detected by the error detection decoder 302. An important aspect of the present invention is that the side information i provides an intuitive indication whether errors may be present in the recovered digital symbols y' of a frame and is used to determine whether or not to erase a frame, even though the error detection mechanism indicates that errors are not present in the recovered digital symbols y' of the frame.

Figure 4:
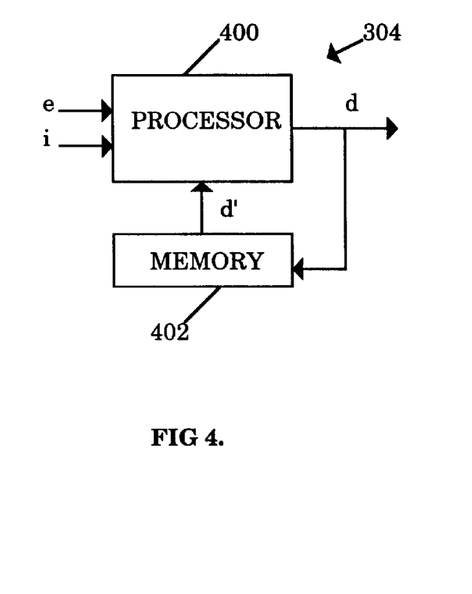
FIG. 4 is one embodiment of the decision apparatus of the signal processor unit of FIG. 3 in accordance with the present invention.

One embodiment of the decision apparatus is shown in FIG. 4. A processor 400 receives the error indicator e and the side information i, as well as past decisions d' stored in a memory 402. The processor 400 uses this combination of information to determine the next decision d. The processor 400 can take several forms; one form may be a rule-based processor, such as an LISP programmable device or the like, using artificial intelligence approaches. For example, the processor 400 may apply the following set of rules in determining the decision d:

1. If the error indicator e indicates errors, then the decision d equals erase the frame.
2. Otherwise, if the side information i indicates a high probability that errors exist and a frame has not been erased within a preset time period or predetermined number of previous frames, then the decision d equals erase the frame.
3. If 1. or 2. do not apply, then d equals keep the frame.

A further embodiment of the processor 400 is to use a neural network, such as the BRAIN CELL™, manufactured by Promised Land Technologies, Inc., New Haven, Conn., the ANZAPLUS™, manufactured by Hecht-Nielsen Neuro Computer Corporation of San Diego, Calif. or the like, that is trained using perception testing. In this embodiment, the decision rules are embedded in the weights used in the neural network.

Figure 5:
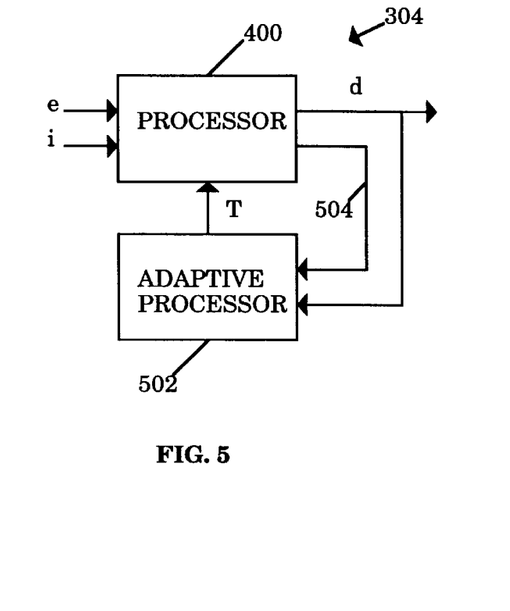
FIG. 5 is another embodiment of the decision apparatus of FIG. 3 in accordance with the present invention.

Another embodiment of the decision apparatus 304 is illustrated in FIG. 5. In this embodiment, the processor 400 receives one or more thresholds T, as well as the error indicator e and the side information i. If e indicates an error, the decision d is to erase the frame. If e indicates no error, a quality measure from the side information i is compared to a corresponding threshold T and if the quality measure exceeds the corresponding threshold value T, the decision d is to erase the frame; otherwise, the decision d will be to keep the frame to reconstruct the signal s in frame processor 306 (FIG. 3). Alternatively, the process may also be defined in terms of the quality measure falling below a threshold T.

The threshold or thresholds T are adaptively updated in an adaptive processor 502, based on past decisions d. For example, suppose there is a single quality measure such that the larger it is, the more likely an error is present in the recovered digital symbols y' of a frame. If error indicator e indicates no errors, a frame may still be erased if the quality measure from the side information i exceeds the threshold value T. Once one or more frames are erased, the adaptive processor 502 may raise the threshold value T so that fewer frames would be erased in the future by using the quality measure from the side information. The adaptive processor 502 may also use information as to why a frame was erased in adjusting the threshold T to a new value; for example, if frames are erased because the error indicator e indicates an error, then the threshold T may be adapted or adjusted differently than if the frames were erased because the quality measure from the side information i exceeds the threshold value T. This type of information may be passed to the adaptive processor 502 from the processor 400 via a connection 504. The adaptive processor 502 may also be a digital signal processor such as a TMS320C50 by Texas Instruments or the like.

To summarize briefly, the frame erasure decision process is adaptive in that it may be based on prior erasure decisions as discussed with respect to FIG. 4 or a threshold value T adaptively determined or adjusted by the adaptive processor 502 which may be a function of one or more of the following criteria: (1) number of prior frame erasures or non-erasures; (2) time proximity to current decision of prior erasures or non-erasures; (3) frequency or rate of prior erasures or non-erasures; and (4) reason for the frame erasure.

One application of the device or frame reconstruction unit 210 of the present invention is in a digital cellular communications system. Those skilled in the art, however, will recognize that the device of the present invention could be applied as well to other types of communications systems such as video or the like.

Figure 6:
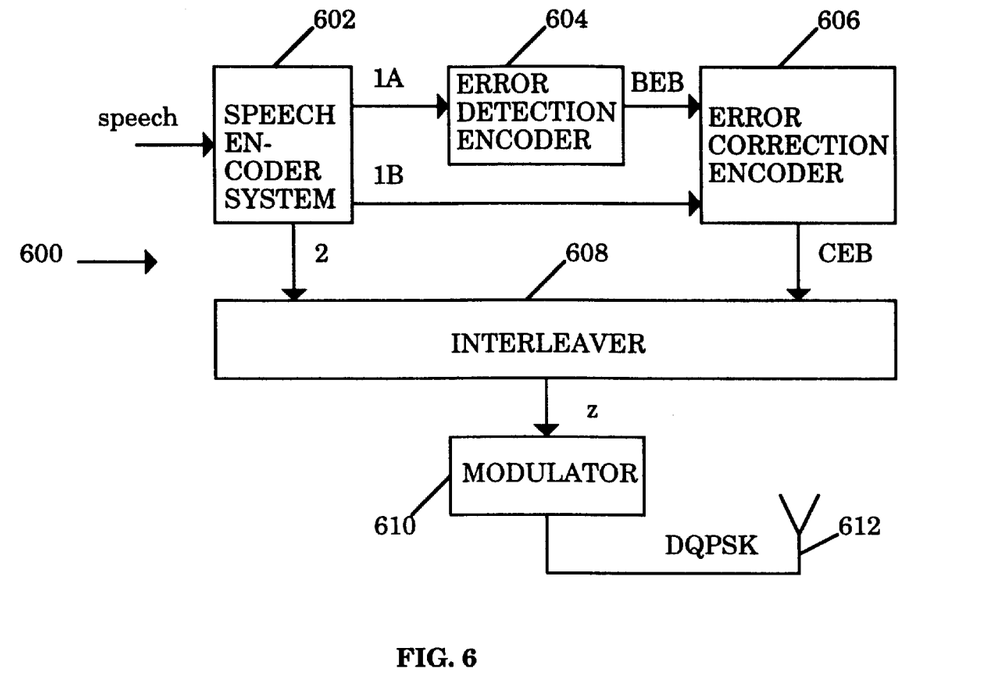
FIG. 6 is a block schematic of a digital cellular transmitter.
Figure 7:
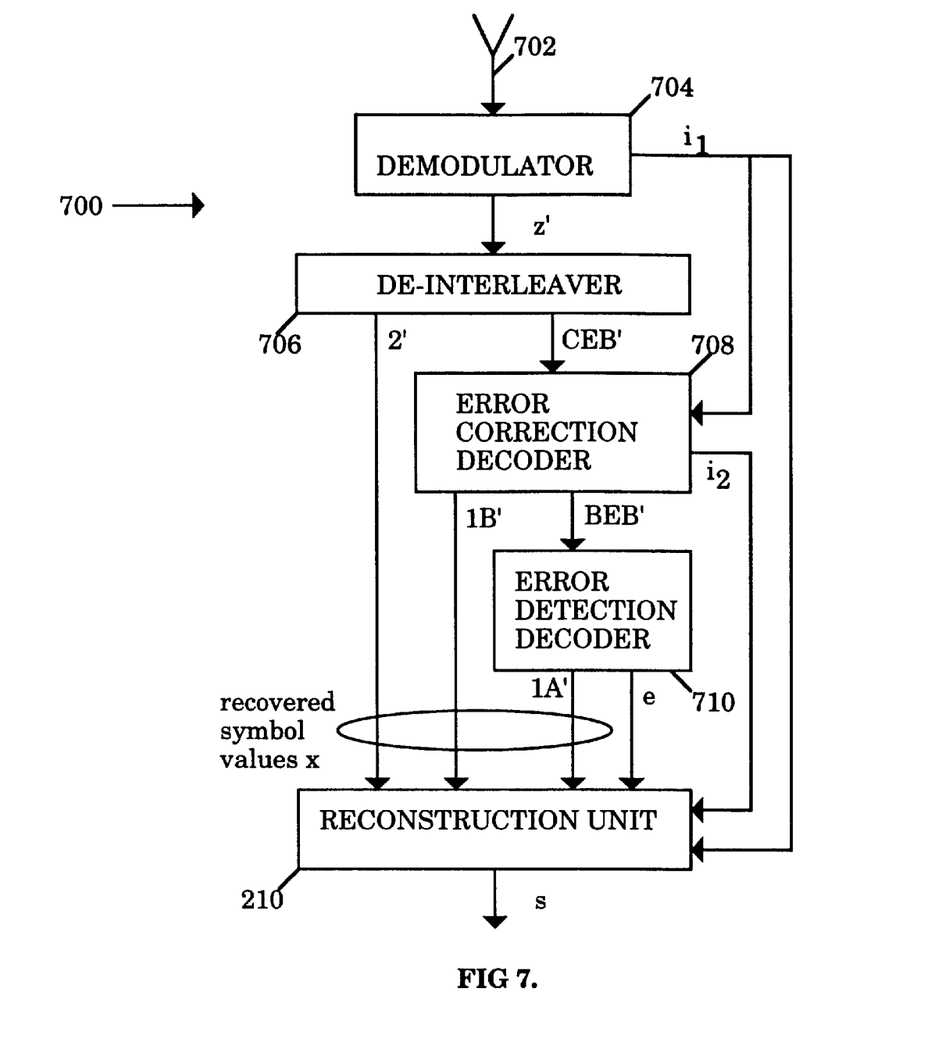
FIG. 7 is a block schematic of a digital cellular receiver in accordance with the present invention.

Referring now to FIGS. 6 and 7, a digital cellular communications system includes a transmitter 600 shown typically in block diagram form in FIG. 6 and a receiver 700 shown typically in block diagram form in FIG. 7. A voice signal (speech) in FIG. 6 is passed through a speech encoder system 602, where the signal is converted to binary digital symbols or bits and divided into individual or separate frames. There are three types or classes of bits, 1A, 1B, and 2, in a digital cellular communications system. Class 1A bits of each frame are passed to an error detection encoder 604, where they are encoded using an error-detecting CRC block code. The error detection encoder 604 may be a digital signal processor such as a TMS320C50 by Texas Instruments or the like. The block encoded bits and the class 1B bits of each frame are then passed to an error correction encoder 606, where they are convolutionally encoded. The error correction encoder 606 may also be a digital signal processor. The convolutionally encoded bits, CEB, and the class 2 bits of each frame are passed to a frame interleaver 608 which interleaves the bits with bits from other speech frames to minimize losses in any particular portion of the signal. The interleaved bit stream, denoted z in FIG. 6, is provided to a modulator 610 which produces a π/4-shift DQPSK digital radio signal type of representation of the digital signal. The digital radio signal DQPSK is then transmitted using an antenna 612.

Referring now to FIG. 7, a receiver antenna 702 receives the radio signal and passes it to a demodulator 704, which may include equalization means to handle any time dispersion of the signal caused by the radio channel. The demodulator 704 provides demodulated bits z' as well as soft information $i_1$ about the reliability or accuracy of the demodulated bits z' in matching or being equivalent to the interleaved bits z in transmitter 600. The demodulated bits z' are passed to a de-interleaver 706, where the bits are de-interleaved into separate speech frames corresponding to the original speech frames in the transmitter 600. The de-interleaved bits corresponding to the class 2 bits, 2', of each frame are passed directly to the reconstruction unit 210; the remaining bits, CEB', and corresponding soft information $i_1$ of each frame are passed to an error correction decoder 708, which performs convolutional decoding using the soft information $i_1$. Error correction decoder 708 may be a digital signal processor or ASIC and the decoding technique may be a Viterbi decoder. The error correction decoder 708 also produces soft information $i_2$ on the reliability of the decoded bits, 1B' and BEB' of each frame individually. The convolutionally decoded bits, 1B', corresponding to the class 1B bits are passed directly to the reconstruction unit 210. The remaining bits BEB' of each frame are passed to the error detection decoder 710, which applies error detection decoding to produce class 1A bits, 1A', and an error indicator or bit e for each frame These bits, 1A' and e, are passed to reconstruction unit 210. The class 1A', 1B' and 2' bits collectively form the recovered digital symbol values x provided to the reconstruction unit 210. The soft information $i_1$ and $i_2$ from the demodulator 704 and the error correction decoder 708, respectively, form the side information for each frame, individually, equivalent to i in FIG. 2 and are provided to the reconstruction unit 210 to perform the reconstruction operation similar to that described with respect to FIGS. 2–5.

The side information $i_2$ from the error correction decoder 708 may be any one or more of the following:

1. A bit correction count obtained by taking the convolutionally decoded bits 1B' and BEB', re-encoding them, and comparing them to the corresponding de-interleaved bits CEB'; or
2. Decoding metrics formed as part of the error correction decoding process, such as metrics in a Viterbi decoder.

Side information $i_1$ from the demodulator 704 may be any one or more of the following:

1. Soft information on the demodulated bits, related to the likelihood of the bit values being the detected values;

2. Metric values from the demodulator 704 (if the demodulator uses a Viterbi equalizer) or some measure of the metric values may be used, such as the difference between two metrics or the size of the final metric;
3. Received signal strength;
4. Channel gain, which may be determined from a synchronization field or from a channel tracker within the demodulator;
5. Noise estimates; or
6. Synchronization information.

The above lists for side information are for purposes of illustration and not intended to limit the scope of the present invention.

Figure 8:
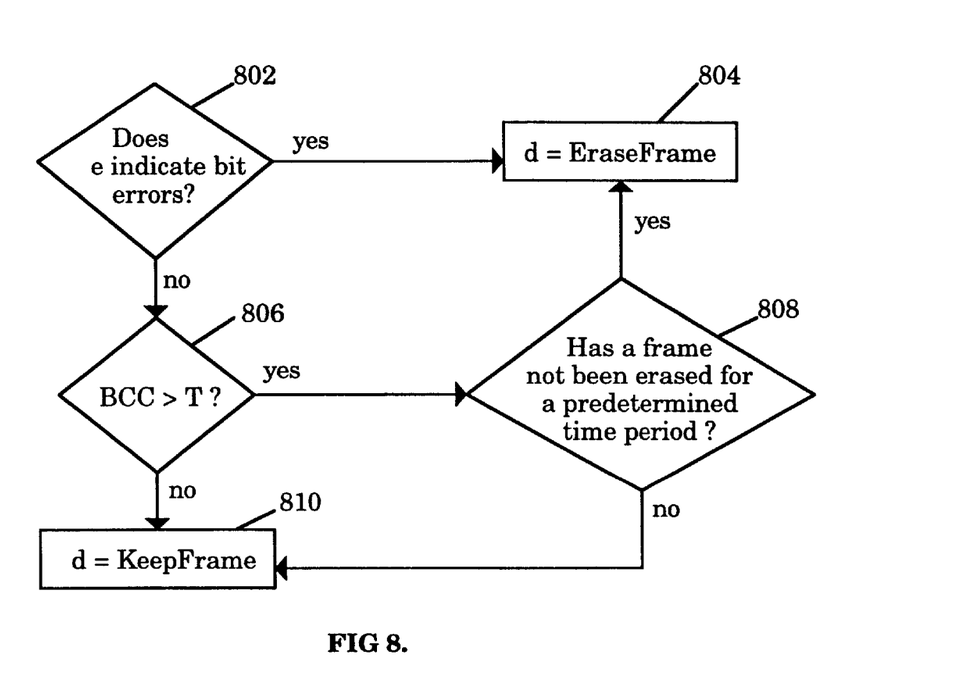
FIG. 8 is a flow graph illustrating a method for determining whether or not to erase a frame in the reconstruction process of a recovered information signal.

Referring back to FIG. 4, if a bit correction count is used as side information, processor 400 could implement the procedure illustrated in FIG. 8 for making a decision. In block 802, the processor determines whether the error indicator e indicates bit errors in the recovered digital symbols of the current or present frame. If bit errors are indicated, the decision d is to erase the frame in block 804. If the error indicator e does not indicate any bit errors, then the processor 400 determines if the bit correction count (BCC) is greater than zero or some threshold value T in block 806. If the BCC exceeds T, then the processor 400 determines from the memory 402 if a frame has not been erased for over a pre-determined time period or number of prior frames in block 808. If a frame has not been erased for over a pre-determined time period or number of prior frames in block 808, then the decision d is to erase the frame in block 804; otherwise, the decision d is to keep the frame in block 810. Likewise, if BCC in block 806 does not exceed zero or T, then the decision d is to keep the frame.

Figure 9:
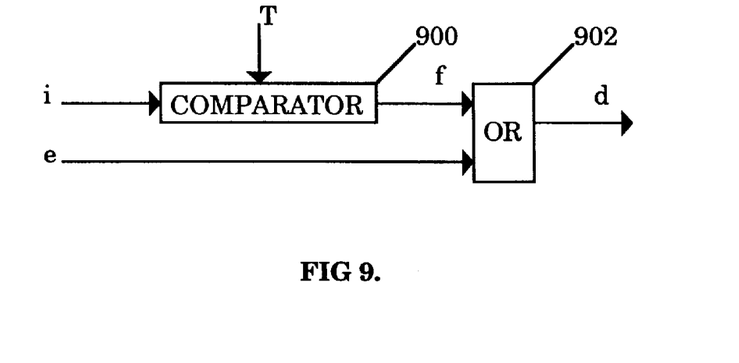
FIG. 9 is a block schematic of a processor in accordance with a further embodiment of the present invention.

The decision process illustrated in FIG. 8 may also be implemented with the circuit shown in FIG. 9. The error indicator e would be a bit equal to "1" if an error is detected in the recovered digital symbols of a frame and would be "0" if no errors were detected. A comparator 900 would compare the bit correction count, according to block 806, to a threshold value T. The comparison indicator bit value f is set to "1" if the side information i exceeds T; otherwise, comparison bit value f would be set to a "0." Assuming decision d is "0" or a low for a decision to keep the frame and a "1" or a high for erasing the frame, decision d is determined by ORing bits e and f in OR device 902. It should be noted in this example that past decisions d are not used and accordingly memory device 402 in FIG. 4 may be omitted in this embodiment.

In a further embodiment of the present invention, the threshold value T in FIG. 9 may be determined by an adaptive processor, similar to the adaptive processor 502 shown in FIG. 5, using past decisions d to adapt or adjust the value of T. The adapted threshold value is then used by the comparator 900. The threshold T may be increased by a predetermined amount every time an erase decision is made or alternatively decreased by a predetermined amount every time a decision to keep a frame is made. Another example of an adaptive threshold is to set the threshold T to a maximum value or to force bit f to zero if any of a predetermined number of prior frames have been erased, or alternatively, to set the threshold T to a minimum value or to force bit f to a high or "1" if a predetermined number of prior frames have not been erased or if a frame has not been erased for the selected time period.

Those skilled in the art will recognize that the present invention may be used to adaptively reduce the complexity of the signal recovery process. As shown with respect to the example in FIG. 6, some digital symbols are error correction encoded and some are not. If the side information $i_1$ (FIG. 7) from the demodulation process indicates that the frame will be erased, then there is no need to perform the error correction decoding and error detection decoding processes. In a portable terminal, this processing savings can be used to perform other tasks or to save battery power.

Referring to the embodiment of FIG. 9, it should be noted that other savings may be achieved on a regular basis. Bit f indicates when a frame is erased because of side information, while bit e indicates when a frame is erased because of error detection. If most frames are being erased because of bit f, then it may be advantageous to reduce the complexity of the error correction decoding process so that bit e will better reflect frame quality. For example, error correction decoding may be performed without the side information $i_1$ from the demodulator 704; omitting the side information $i_1$ saves complexity in both the demodulation and error correction decoding processes. Conversely, the processing can initially not use the side information and then add this complexity should more frames be erased because of the error detection mechanism.

It will be readily understood by those skilled in the art that the present invention is not limited to the specific embodiments described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. In a digital communications system, a device for receiving and reconstructing signals with improved perceived signal quality, comprising:

a recovery unit for receiving a digital representation of an information signal, divided into a plurality of frames, from a transmitter of the communications system, said recovery unit converting each frame of the digital representation into a corresponding frame of recovered digital symbols and side information; and     an error detection decoder for detecting errors in at least a portion of the recovered symbols; and     a reconstruction unit to reconstruct the information signal using the frames of recovered symbols and the side information, said reconstruction unit erasing or not erasing a frame in response to the side information, error detection decoding information and past frame erasure information.

2. The device of claim 1 wherein said reconstruction unit replaces the frame if erased.

3. The device of claim 1, wherein the side information is a quality measurement of the recovered digital symbols of the frame and is compared to a threshold value to determine whether to use any of the recovered digital symbols of the frame to reconstruct the original information signal.

4. The device of claim 3, wherein said threshold value is adjusted as a function of at least one of:

number of prior frame erasures or nonerasures;

time proximity of current frame to prior frame erasures or nonerasures;

frequency of prior frame erasures or nonerasures; and reasons for prior frame erasures.

5. The device of claim 1, wherein said reconstruction unit comprises:

a decision apparatus to cause the present frame to be erased if one of the following conditions occurs:

(i) the error indicator indicates that an error was detected in the portion of recovered digital symbols of the present frame; and         (ii) the error indicator indicates that an error was not detected but the side information indicates that an error may be present in the recovered digital symbols of the present frame and a frame has not been erased for a predetermined period of time or predetermined number of earlier frames.

6. The device of claim 5, wherein the decision apparatus comprises a neural network.

7. The device of claim 5, wherein the decision apparatus comprises a rule-base processor.

8. The device of claim 5, wherein said reconstruction unit comprises a frame processor and wherein said decision apparatus provides a decision used by said frame processor, said decision being that said frame processor use at least the portion of the recovered digital symbols of the present frame to reconstruct the original information signal, if both the error indicator and the side information indicate no errors in the recovered digital symbols of the present frame, and said decision being that said frame processor not use the recovered digital symbols of the current frame if at least one of conditions (i) and (ii) occurs.

9. A receiver in a digital cellular communication system having improved perceived signal quality, said receiver comprising:

an antenna for receiving electromagnetic waves;

a demodulator for demodulating a digital radio signal, divided into frames, to form demodulated digital symbols, divided into bursts, and demodulated side information associated with each burst;

a de-interleaver for de-interleaving the demodulated symbols of each burst to produce a set of de-interleaved digital symbols corresponding to a frame;

an error correction decoder for error correction decoding at least a subset of the de-interleaved symbols to produce a set of error correction decoded digital symbols and decoding side information defining the quality of the error correction decoded digital symbols of each frame;

an error detection decoder for error detection decoding at least a subset of the error correction decoded digital symbols to produce a set of error detection decoded symbols and an error indicator for each frame; and     a signal reconstruction unit for reconstructing an original information signal from the frames of digital symbols, said signal reconstruction unit using a combination of the demodulated side information and error correction decoding side information of a particular frame, error indicator of the particular frame and past frame erasure decisions to decide whether to use any of the digital symbols from the particular frame in the reconstruction of the original information signal.

10. The receiver of claim 9, wherein the decoding side information is at least one of a bit correction count and decoding metrics.

11. The receiver of claim 9, wherein demodulated side information is at least one of soft information on the demodulated digital symbols, metric values from the demodulator, a function of at least two metric values, received signal strength, channel gain, noise, and synchronization information.

12. A method for improving perceived signal quality in a receiver of a digital communications system, comprising the steps of:

(a) recovering a digital representation of an information signal transmitted over a channel of the communications system to provide a set of recovered digital symbols, divided into a group of frames, and side information associated with each frame; (b) applying error detection decoding to at least a portion of recovered digital symbols of each frame to provide an error indicator for each frame;

(c) reconstructing the information signal from the group of frames of recovered digital symbols; and (d) determining whether to use a frame of the group of frames to reconstruct the information signal in response to the side information of the frame and past frame erasure decisions, even though the error indicator indicates that no errors are present in the frame.

13. The method of claim 12, wherein step (d) comprises the step of forming a decision as to whether or not to erase a frame using the error indicator for the frame, the side information of the frame and past information decisions;

the error detection decoding also providing a set of decoded bits; and said method further comprising the step of frame processing to reconstruct the information signal using at least the decision, and the decoded bits.

14. The method of claim 12, wherein step (d) is accomplished by a neural network.

15. The method of claim 12, wherein step (d) is accomplished by a rule-based processor.

16. The method of claim 12, wherein step (b) is not performed on a frame if the side information of the frame indicates that the frame will be erased.

17. The method of claim 12, wherein step (a) comprises the step of not using a frame of recovered digital symbols in step (c) if one of the following conditions occurs:

(i) the error indicator indicates that an error was detected in the digital symbols of the frame; and (ii) the error indicator indicates that an error was not detected but the side information indicates that an error may be present in the digital symbols of the frame and a frame has not been erased for over a predetermined period of time or more than a predetermined number of earlier frames.

18. The method of claim 12, wherein step (d) comprises the steps of:

(d1) adaptively forming a threshold value as a function of at least past frame erasure decisions; and (d2) comparing the side information to the threshold value to determine whether or not to use a frame to reconstruct the information signal.

19. The method of claim 18, wherein step (d2) comprises the step of forming a comparison indicator bit value; and said method further comprising the step of performing a logical OR operation of the comparison indicator bit and the error indicator to form a decision bit value as to whether or not to use a frame to reconstruct the information signal.

20. The method of claim 12, further comprising the steps of:

applying error correction decoding to at least a portion of the recovered digital symbols of each frame to correct any bit errors in the recovered digital symbols; and not performing step (b) and the error correction decoding on a frame if the side information of the frame indicates that the frame will be erased.

21. The method of claim 20, further comprising the step of reducing the complexity of error correction decoding if a predetermined number of frames are erased because of the side information.

22. The method of claim 21, wherein the step of reducing the complexity of error correction decoding comprises the step of performing the error correction decoding without applying the side information.

\* \* \* \* \*